April 8, 1952      D. B. GARDINER      2,591,800
HYDRAULIC CONTROL VALVE

Filed March 13, 1947      4 Sheets-Sheet 1

INVENTOR.
DUNCAN B. GARDINER
BY *Ralph L. Tweedale*
ATTORNEY

April 8, 1952    D. B. GARDINER    2,591,800
HYDRAULIC CONTROL VALVE

Filed March 13, 1947    4 Sheets-Sheet 2

INVENTOR.
DUNCAN B. GARDINER
BY
ATTORNEY

April 8, 1952     D. B. GARDINER     2,591,800
HYDRAULIC CONTROL VALVE

Filed March 13, 1947     4 Sheets-Sheet 3

*INVENTOR.*
DUNCAN B. GARDINER
BY *Ralph L. Tivedale*
ATTORNEY

April 8, 1952     D. B. GARDINER     2,591,800
HYDRAULIC CONTROL VALVE

Filed March 13, 1947     4 Sheets-Sheet 4

INVENTOR.
DUNCAN B. GARDINER
BY Ralph L. Tweedale
ATTORNEY

Patented Apr. 8, 1952

2,591,800

UNITED STATES PATENT OFFICE 2,591,800

HYDRAULIC CONTROL VALVE

Duncan B. Gardiner, Detroit, Mich., assignor to Vickers Incorporated, Detroit, Mich., a corporation of Michigan Application March 13, 1947, Serial No. 734,371

8 Claims. (Cl. 121—46.5)

This invention relates to power transmissions, particularly to those of the type comprising two or more fluid pressure energy translating devices, one of which may function as a pump and another as a fluid motor.

The invention is generally concerned with a pilot valve operated directional control valve mechanism for controlling the direction of fluid flow in such transmission systems. In particular, the invention relates to an improvement in the construction of a directional control valve body upon which a pilot valve body containing cooperative passages may be conveniently directly mounted.

In the past, it has been customary to use in such transmissions a directional control valve and a pilot valve for controlling the former separated at some distance therefrom and connected to the same by fluid conduits. In some cases special bodies, known in the art as panels, are constructed to house both a directional control valve and a pilot valve. The panels due to their special construction are expensive to manufacture. In addition, various types of directional control valves and pilot valves were used in different systems and heretofore each type of valve has been designed and constructed independently and differently from the others without regard to economies of manufacture which would ensue if they were constructed from identical basic parts so far as possible.

It is therefore an object of this invention to provide a basic directional control valve body which may be used to mount therein various types of directional control valves.

It is a further object of this invention to provide a basic directional control valve body within which may be mounted a fluid operated directional control valve and upon which may be conveniently mounted a pilot valve provided with a body adapted to cooperate with the directional control valve body.

It is a further object of this invention to provide a basic directional control valve body for mounting a directional control valve which may be operated under the control of a pilot valve mounted directly thereon or by a pilot valve separated therefrom and connected to the same by fluid conduits.

It is also an object of this invention to provide an improved directional control valve and pilot valve body construction which are readily adapted to low cost manufacture and which are convertible to a multiplicity of purposes when used singly or together in combination.

Further objects and advantages of the present invention will be apparent from the following description, reference being had to the accompanying drawings wherein a preferred form of the present invention is clearly shown.

Figure 2:
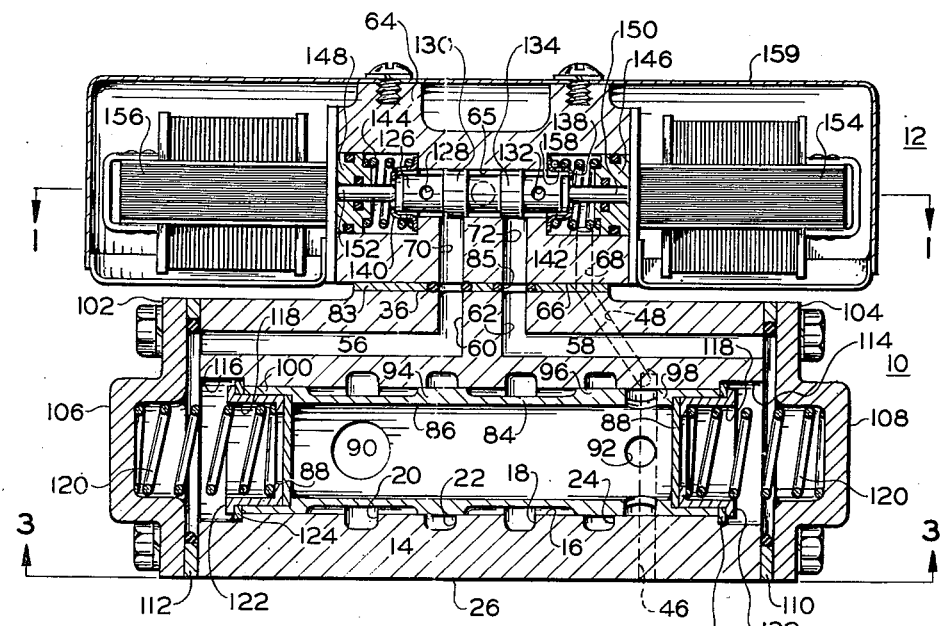
Figure 2 is a partial sectional view of the present invention on line 2—2 of Figure 1.

Referring now to Figure 2 there is shown a directional control valve, indicated generally by the numeral 10, upon which is mounted a solenoid operated pilot valve for controlling the former and which is indicated generally by the numeral 12.

The directional control valve 10 is comprised of a body 14 having a longitudinal bore 16 extending completely therethrough, said bore being provided with spaced apart grooves forming a pressure port 18, a tank port 20 and a pair of operating ports 22 and 24, the latter of which are located on opposite sides of the pressure port 18.

Figure 3:
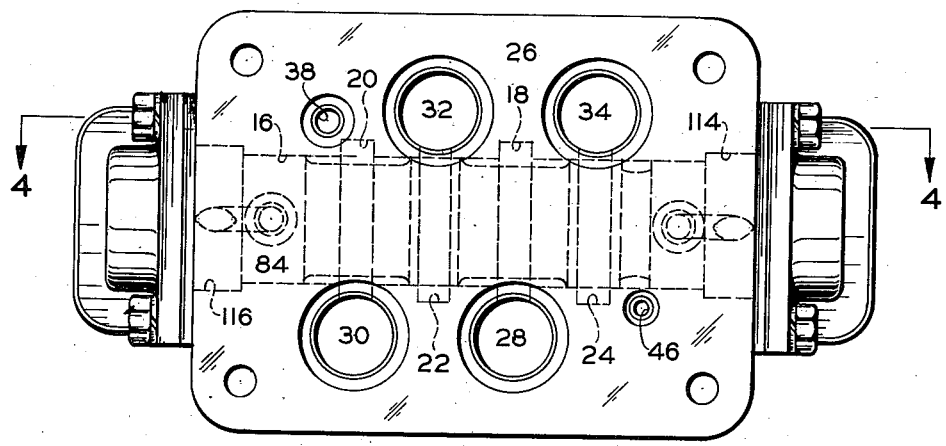
Figure 3 is a bottom view of the present invention on line 3—3 of Figure 2.
Figure 4:
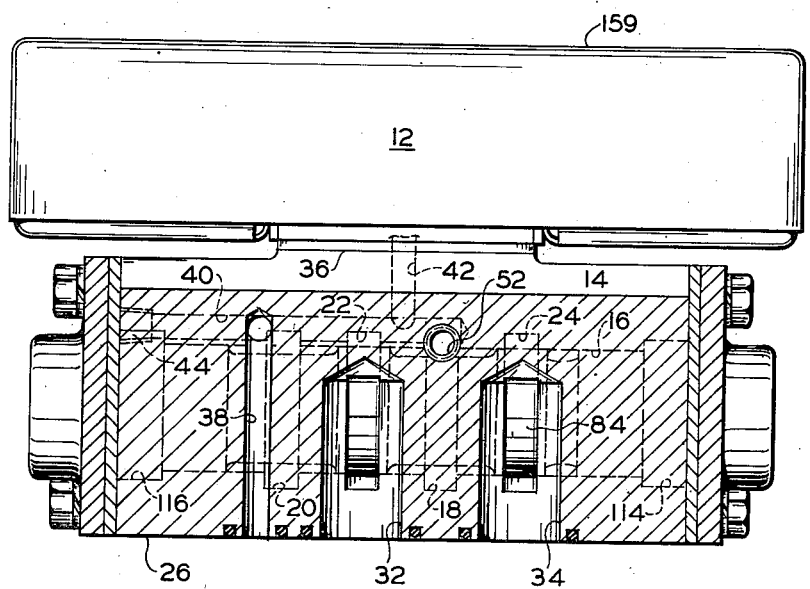
Figure 4 is a partial sectional view of the present invention on line 4—4 of Figures 1 and 3.

Referring now to Figures 2, 3 and 4, the bottom of the body 14 is provided with a flat surface area indicated by the numeral 26 from which a pressure passage 28, a tank passage 30 and a pair of operating passages 32 and 34 extend directly to a point of intersection with each corresponding valve bore port.

Means for conducting external pilot pressure fluid through the body 14 from the bottom surface 26 to a top flat surface 36 opposed thereto, is provided in the following manner. A passage 38 is constructed from the bottom surface 26 to a point of intersection with a longitudinal passage 40 extending from the left side of the body 14. A passage 42 constructed from the surface 36 extends to a point of intersection with passage 40. The longitudinal passage 40 is closed at the left end thereof by a suitable plug 44.

For the purpose of conducting pilot return fluid from the surface 36 to the surface 26, a passage 46 is constructed from the bottom surface 26 which is intersected by an angular passage 48 constructed from the top surface 36.

Figure 5:
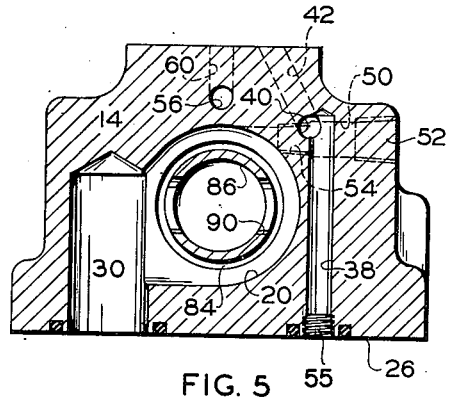
Figure 5 is a partial sectional view of the present invention on line 5—5 of Figure 1.
Figure 6:
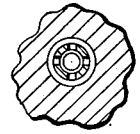
Figure 6 is a partial sectional view of the present invention on line 6—6 of Figure 1.
Figures 7, 8:
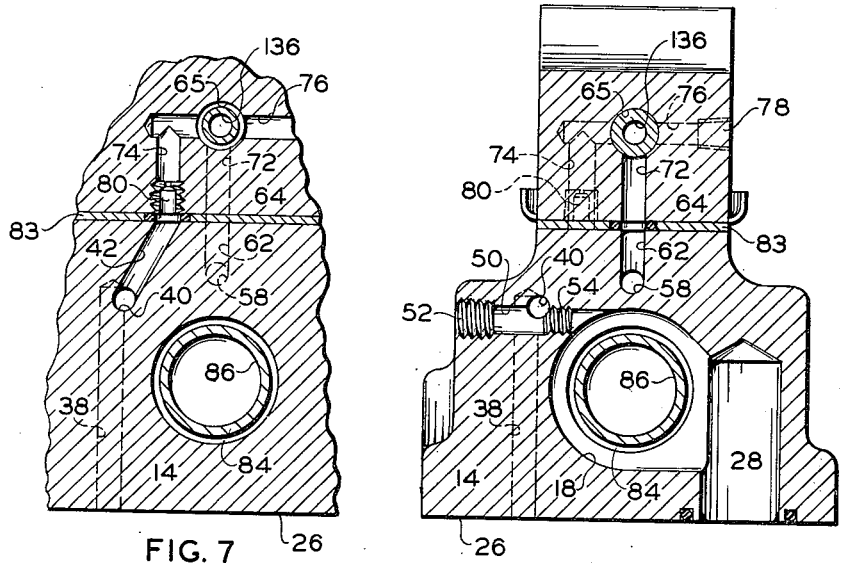
Figure 7 is a partial sectional view of the present invention on line 7—7 of Figure 1.
Figure 8 is a sectional view of the present invention on line 8—8 of Figure 1.

Means for conducting internal pilot pressure fluid from the pressure passage 28 to the surface 36 is provided as follows. As shown in Figure 8, a passage 50 is constructed from the front of the body 14 which intersects both the pressure valve bore port 18 and the longitudinal passage 40. The open end of passage 50 is closed by a suitable plug 52. The passage 50 is threaded between its points of intersection with passage 40 and with pressure valve bore port 18 for the insertion of a suitable plug 54. If it is desired to conduct internal pilot pressure fluid from the pressure passage 28 to the passage 42, the terminus of passage 38 may be blocked at surface 26 by a plug 55, as illustrated in Figure 5, and the plug 54 removed. If it is desired to conduct external pilot pressure fluid from the surface 26 to the surface 36 by means of passage 38, the plug 54 is inserted in passage 50 to block pressure flow from the valve port 18 to the passage 40.

Duplicate pilot operating passages are provided in the body 14 by constructing two passages 56 and 58 extending from the left and right sides, respectively, of said body, which respectively are intersected by vertical passages 60 and 62, constructed from the surface 36.

By constructing the body 14 with the flat surface 26, it may be clearly seen that the body 14 is ideal for mounting the same, in the well known manner, upon a manifold block, not shown, containing connection ports and passages adapted to cooperate with the passages extending to the surface 26. In addition, the body 14 has the novel feature of having pilot pressure, pilot return and pilot operating passages extending to the flat surface 36 so that a pilot valve body having at least one flat surface area, and with pilot valve pressure, return and operating passages extending to said surface, may be mounted upon the body 14 with the corresponding passages of both valve bodies registering in cooperative relationship.

For this purpose, there is provided a pilot valve body 64 having a longitudinal bore 65 extending completely through said body which is enlarged at both ends. The pilot valve body 64 is provided with a flat bottom surface indicated by the numeral 66. Separate spaced apart passages are constructed extending from the surface 66 to the valve bore 65, namely, a pilot return passage 68 adapted to register with the angular passage 48 and two pilot operating passages 70 and 72 adapted to register respectively with passages 60 and 62.

As is shown more clearly in Figures 7 and 8, means for conducting pilot pressure fluid from the passage 42 of body 14 to the bore 65 of pilot valve body 65 is provided by constructing a passage 74 from the surface 66 of body 64, which is adapted to register with passage 42 of body 14.

Figure 9:
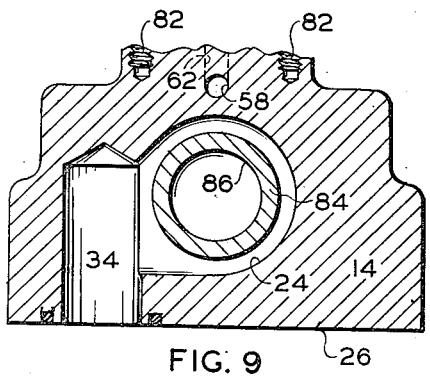
Figure 9 is a partial sectional view of the present invention on line 9—9 of Figure 1.

Passage 74 intersects a passage 76 constructed through the body 64, the latter passage also intersecting the pilot valve bore 65. The open end of passage 76 is closed by a suitable plug 78. The passage 74 may be threaded for the insertion of a suitable restriction plug 80. The pilot valve body 64 may be mounted upon the directional control valve body 14 by the insertion of suitable machine screws in mounting holes, indicated generally by the numeral 82 and shown in Figures 1 and 9, which are provided in the bodies 64 and 14 and which are adapted to register with each other.

A spacer 83 containing a plurality of holes equal in number to the number of mounting holes and passages extending from the flat surfaces 36 and 66 of the bodies 14 and 64 is placed between said bodies. The holes in the spacer 83 may be of larger diameter than the diameters of the passages with which they register for the purpose of placing suitable seals 85 therein for abutting the flat surface immediately surrounding the cooperative passages with which they register.

Figure 1:
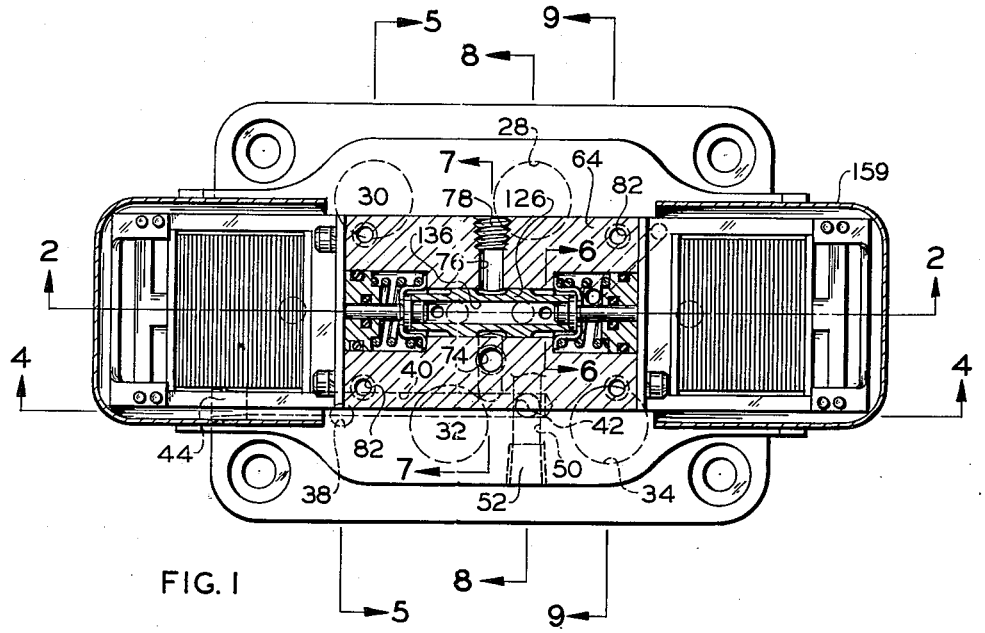
Figure 1 is a top plan view, partially in section on line 1—1 of Figure 2, of a preferred form of the present invention.

Referring now to Figures 1 and 2, there is shown reciprocably mounted in the bore 16 of the body 14 a four-way directional valve spool 84. The valve spool 84 is provided with a longitudinal bore 86 closed at each end by braised discs 88 and with a plurality of transverse ports 90 and a plurality of transverse ports 92 located at opposite ends of the spool which communicate with the bore 86. The spool 84 is of the closed center type having spaced apart centrally located lands 94 and 96 and extreme right and left end lands 98 and 100.

Duplicate end caps 102 and 104 having hollow projecting portions 106 and 108 are suitably bolted to the left and right ends of the body 14. Duplicate spacers 110 and 112 are placed between the end caps and the extreme ends of the body. Right and left end fluid chambers 114 and 116 are automatically formed at opposite ends of the bore 16 which are in communication by means of the spacers 110 and 112, respectively, with the pilot operating passages 58 and 56.

The valve spool 84 is centered to the position shown by means of duplicate spring retainers 118 and springs 120, mounted within the fluid chambers 114 and 116. The retainers 118 are cup shape so that their inner ends fit into the ends of the valve spool bore 16 and abut the outer faces of the discs 88 and are provided with flanges 122 which abut stop rings 124, the latter of which are located in abutting relationship to the ends of the valve spool 84 and the flanges 122. The rings 124 are adapted to abut duplicate shoulders formed near opposite ends of the bore 16 to aid in centering the valve spool 84 in cooperation with the retainers 118 and spring 120. The retainers 118 are open at both ends thereof to permit communication between the chambers 114 and 116 and the discs 88 for permitting pressure fluid admitted to said chambers to shift valve spool 84.

Referring now to the pilot valve 12, a solenoid operated pilot valve spool 126 is reciprocably mounted in the bore 65 of the pilot valve body 64. The spool 126 is provided with a plurality of transverse ports 128 to the left of a land 130 and a plurality of transverse ports 132 to the right of a land 134 which communicate with a longitudinal bore 136 in said spool. The lands 130 and 134 are adapted to connect the pilot pressure passage 76 with either passage 70 or 72 for the purpose of conducting pressure fluid to either end of the directional valve spool 84. The transverse ports 128 and 132 and the bore 136 of the spool 126 provide means for directing return fluid from passage 70 to the right end of bore 65 when the spool 126 is shifted to the right. Both ends of the bore 65 are enlarged to provide mounting chambers for right and left end spring retainers 138 and 140, respectively, duplicate springs 142 and 144, and operating pin guides 146 and 148.

Duplicate solenoid operated push-pins 150 and 152 are slidable, respectively, within the guides 146 and 148 and through the spring retainers 138 and 140. The pins 150 and 152 are shifted in the conventional manner by suitable solenoids 154 and 156 mounted on the right and left ends, respectively, of the body 64.

The retainers 138 and 140 are hollow and cup-shaped so that the opposite ends of the pilot valve spool 126 may fit therein. The retainer 138 is provided with a plurality of ports 158 to form a means of communication between the transverse ports 132 of the spool 126 and the right end of the bore 65. Pilot return fluid is permitted in this manner to be conducted to the pilot return passage 68 which intersects the bore 65 immediately to the left of the guide 146.

The pilot valve spool 126 is also of the closed center type so that the pressure passage 76 is blocked from the pilot operating passages 70 and 72 when the spool is centered to the position shown.

The complete pilot valve mechanism, including the solenoids, may be suitably enclosed by a box cover plate 159.

The body 14 is adapted to be mounted on a manifold block, not shown, in the well known manner, having fluid connection ports adapted to register in cooperative relationship with the passages opening to the surface 26.

Thus, with plug 54 removed and with passage 38 being blocked at the surface 26 by a plug 55, as illustrated in Figure 5, and with a source of pressure fluid connected to the passage 28, the operation of the pilot valve 12 and the directional control valve 10 will be as follows.

In the position shown, pressure fluid entering the passage 28 will be directed to the pressure port 18 from where it is conducted to the pilot pressure passages 74 and 76 of pilot valve body 64 by means of passages 50, 40, and 42. The lands 94 and 96 of valve spool 84 block communication between the pressure port 18 and the operating ports 22 and 24. In addition, the pilot valve spool 126 will block the flow of fluid to either passage 70 or 72. If solenoid 154 is energized to shift the valve spool 126 leftwardly, the pilot pressure passage 76 will be connected to the pilot operating passage 70. Fluid is conducted from passage 70 to the left chamber 116 of directional control valve 10 by means of passages 60 and 56 to shift the spool 84 rightwardly. Pressure fluid displaced from chamber 114 is conducted by means of passages 58 and 62 to passage 72 of pilot valve body 64. From passage 72 fluid is directed by means of land 134 of spool 126 through the ports 158 of retainer 138 to the right end of bore 65 and thence to passages 48 and 46 of control valve body 14 by means of passage 68.

With spool 84 shifted completely to the right, pressure fluid entering passage 28 is conducted from valve port 18 to valve port 24 and passage 34. The valve port 22 is connected to the tank port 20 and the passage 30 to take care of return flow.

If solenoid 154 is de-energized and solenoid 156 energized, the valve spool 126 is shifted rightwardly to connect the pilot pressure passage 76 to the pilot operating passage 72 for conducting fluid to the right fluid chamber 114 of directional valve 10 by means of passages 62 and 58. The left fluid chamber 116 will be connected to the passage 70 of pilot valve body 64 by means of passages 56 and 60 and fluid is conducted to the pilot return passage 68 by means of transverse ports 128 and 132 of pilot valve spool 126 and the ports 158 of the retainer 138. With the directional valve spool 84 shifted leftwardly, the pressure port 18 is connected to operating port 22 and the operating port 24 is connected to the tank port 20 by means of the transverse ports 92, bore 86, and the transverse ports 90 of the spool 84. When both of the solenoids 154 and 156 are de-energized, the pilot valve spool 126 and the directional valve spool 84 are both returned to the centered position shown.

It should be noted that the right and the left end surfaces of the pilot valve body 64 are flat which provide ideal mounting surfaces for either solenoids or end plates. Thus, the directional control valve body 14 and the pilot valve body 64 in combination are ideally suited for numerous purposes.

Figure 12:
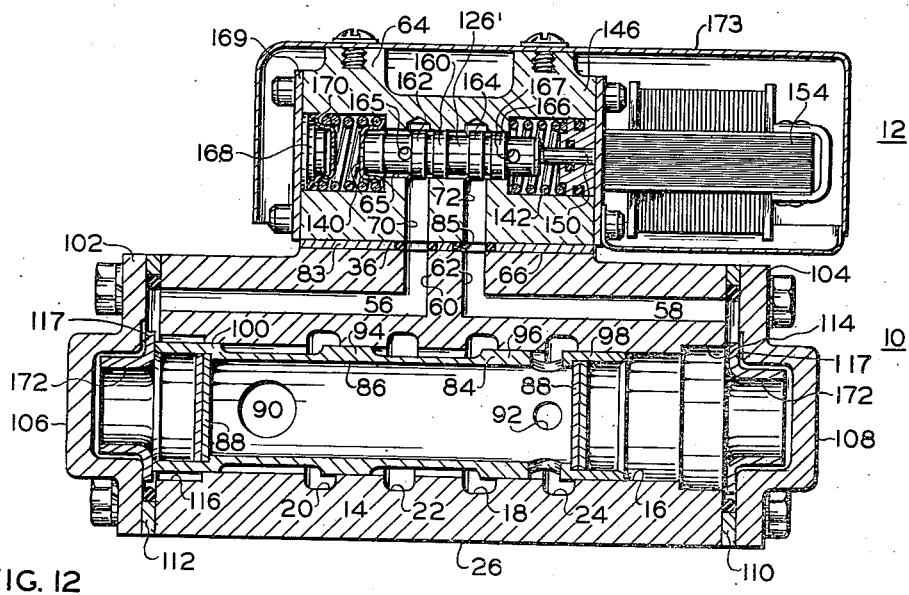
Figure 12 is a sectional view of still another form of directional control valve embodying a preferred form of the present invention.

For example, referring to Figure 12, a pilot valve spool 126' may be mounted in the bore 65 of the body 64 which may be spring off-set and single solenoid operated. The spool 126' is provided with a pair of lands 160 and 162 to the left of the center position of the spool and a pair of lands 164 and 166 to the right of the center position of the spool.

A plurality of transverse ports 165 to the left of land 162 and a plurality of transverse ports 167 to the right of land 166 connect to a longitudinal passage, not shown, within the spool 126'.

The right spring retainer 138 is removed from the right end of bore 65 and a solid plug 168 inserted in the left end of bore 65 in place of guide 148. Solenoid 154 is retained, but the solenoid 156 is omitted and a plate 169 suitably bolted to the left end surface of the body 64. By placing an additional spring retainer 170 over the right end portion of the plug 168 and making use of the original springs 142 and 144 and the retainer 140, the spool 126' will normally be offset to the position shown when the solenoid 154 is deenergized.

The same directional control valve spool 84 may be used, but the springs 120 and the retainer 122 are omitted. Duplicate stops 172 are substituted in place of the retainers 122 to properly limit the travel of the spool. In order to permit the entrance and exit of fluid to and from the chambers 114 and 116, each of the end cap members 102 and 104 is provided with a slot indicated by the numeral 117, and the stop members 172 are adapted to fit loosely in the end cap members. A box cover plate 173 is mounted over the complete pilot valve mechanism.

It should be noted, however, that the basic pilot valve body 64 and the basic directional control valve body 14 are made use of without any constructional changes having to be made.

In operation, with plug 54 removed, and the body 14 mounted upon a manifold block, not shown, as previously described in the operation of the spring centered type of directional control valve, and with a source of pressure fluid being connected to passage 28, the flow of fluid will be as follows.

With solenoid 154 de-energized, the valve spool

126' will be off-set to the position shown. The flow of fluid entering the directional control valve 10 will be the same as previously described. However, instead of being blocked at the bore 65 of pilot valve body 64, the spool 126' will direct pressure fluid to passage 72 which registers with passage 62 of directional control valve body 14. From passage 62 fluid is directed to the right fluid chamber 114 by means of passage 58 and the spool 84 is shifted to the left. Fluid displaced from the left fluid chamber 116 is conducted to the bore 65 of pilot valve body 64 by means of passages 56, 60, and 70. Fluid is then conducted to the pilot return passage 68 by means of the spool 126' and to passage 46 of body 14 by means of passage 48 which registers with passage 68.

The directional control valve spool 84 is normally maintained in the position shown so as to continually connect pressure port 18 to operating port 22 and the operating port 24 to the tank port 20. However, when the solenoid 154 is energized, the pilot valve spool 126' is shifted leftwardly and fluid will be directed to the left fluid chamber 116 of the directional control valve 10 to shift the spool 84 rightwardly in the following manner. Referring to Figures 7, 8, and 12 pressure fluid entering the passage 28 will be directed to the pressure port 18 from where it is conducted to the pilot pressure passages 74 and 76 by means of passages 50, 40, and 42. With pilot valve spool 126' shifted leftwardly pressure fluid delivered to the bore 65 will be directed by the lands 164 and 160 of the spool 126' to passage 70 and from passage 70 to passages 60 and 56 of the directional control valve body 14 and thence to chamber 116 to shift the spool 84 rightwardly. Fluid displaced from the chamber 114 is delivered to the passage 46 of directional control valve 10 by means of passages 58 and 62, passage 72 and bore 65 of pilot valve 12 where land 166 of the pilot valve spool 126' directs fluid to the right end of bore 65. Fluid is then conducted to passage 46 by means of passages 68 and 48 (Figure 2).

Although the directional control valve body 14 is particularly adapted for mounting directly thereon a pilot valve adapted to cooperate therewith, it also constitutes a basic body within which a fluid operated directional control valve may be mounted adapted to be controlled by a pilot valve separated therefrom and connected thereto by fluid conduits.

Figure 11:
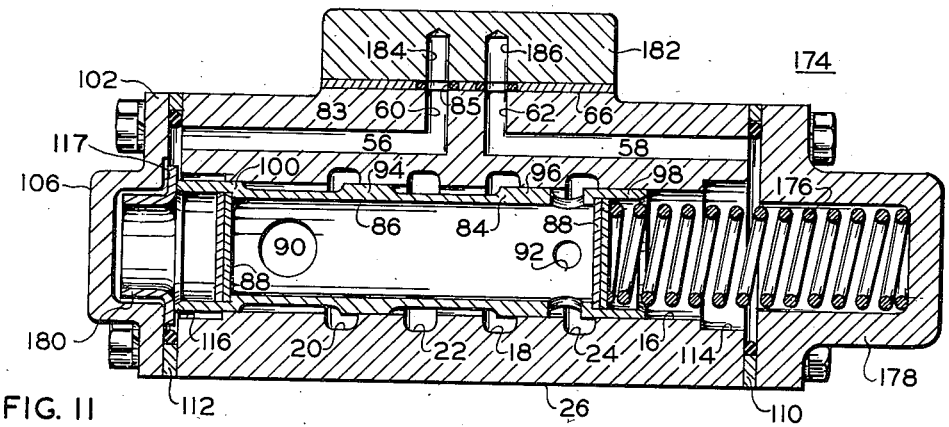
Figure 11 is a sectional view of another form of directional control valve embodying a preferred form of the present invention.

Thus, referring to Figure 11 there is shown a fluid operated, spring offset, directional control valve 174 adapted to be controlled by a pilot valve, not shown.

Within the basic body 14 there is mounted the same valve spool 84 which is, however, biased to the leftward position shown by means of a spring 176. The right end cap 104 is replaced by an end cap 178 having a substantially larger projecting portion within which the right end of the spring 176 is mounted. In addition to the spacers 110 and 112, a stop 180 is mounted in the left end cap 102 to limit leftward travel of the spool 84. The stop 180 is a duplicate of the stops 172 shown in Figure 12. The end cap member 102 is provided with a slot indicated by the numeral 117 and the stop member 180 fits loosely in the end cap member 102 to permit the entrance and exit of fluid to and from the chamber 116.

Figure 10:
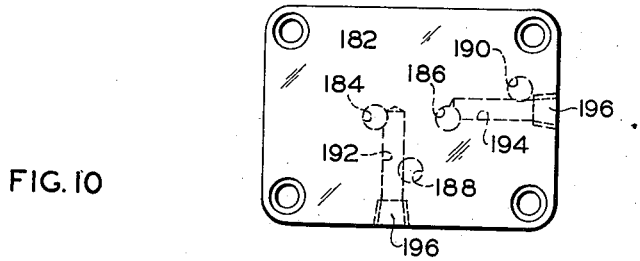
Figure 10 is a top view of the cover plate mounted on the directional control valve shown in Figure 11.

A cover plate 182 also shown in Figure 10 is suitably mounted on the surface 36.

The cover plate 182 is provided with passages adapted to register with the passages of the directional control valve body 14 extending to the surface 36. Thus, the cover plate 182 is provided with a passage 184 registering with passage 60, a passage 186 registering with the passage 62, a passage 188 registering with passage 42, and a passage 190 registering with pilot return passage 48. A passage 192 connects passage 184 to passage 188 and a passage 194 connects passage 186 to passage 190. The open ends of passage 192 and 194 are closed by suitable plugs 196.

Thus, by inserting plug 54 in the body 14 (shown in Figure 8) and mounting the directional control valve 10 upon a manifold block, not shown, having fluid connection ports adapted to register with passages 28, 30, 32, 34, 38, and 46 of the body 14, (shown in Figure 3) the operation of the valve 174 will be as follows when controlled by a pilot valve, not shown, connected to the manifold block.

In the position shown, the spool 84 is normally biased to the leftward position by the spring 176 and the pressure port 18 is connected to the operating port 22 while the operating port 24 is connected to the tank port 20. However, when a pressure fluid source is connected to passage 38 (Figure 5) by the pilot valve, not shown, pressure fluid will be directed to the left chamber 116 to shift the spool 84 against the resistance of the spring 176 in the following manner. Referring to Figures 5, 10 and 11 pressure fluid entering passage 38 is conducted to the passage 188 of cover plate 182 by means of passages 40 and 42 in the body 14, the latter passage of which is adapted to register with passage 188 in the cover plate 182. From passage 188 fluid is conducted by means of passages 192 and 184 in the cover plate to passage 60 of body 14 from where it is conducted to fluid chamber 116 by passage 56. Fluid displaced from the right fluid chamber 114 is adapted to return to the pilot valve by means of passages 58 and 62 of the body 14, passages 186, 194, and 190 of the cover plate 182 and passages 48 and 46 of the body 14. Passage 190 of the cover plate is adapted to register with passage 48 unloading to the surface 36 and shown in Figure 2.

Thus, the directional control valve body 14 constitutes a basic, multiple purpose valve body adapted for mounting therein control valves which may be controlled by a pilot valve directly mounted thereon or by a pilot valve connected thereto by fluid conduits. Although not shown, it is apparent that the basic directional control valve body is also readily adaptable for mounting therein a manually operable directional control valve or a solenoid operated control valve. In addition, the pilot valve body is also readily adaptable for mounting therein a mechanically actuated pilot valve spool.

While the form of embodiment of the invention as herein disclosed constitutes a preferred form, it is to be understood that other forms might be adopted, all coming within the scope of the claims which follow.

What is claimed is as follows:

1. A directional control valve housing comprising a body including a first and a second opposed, flat surface area, a valve receiving bore extending completely through the body including a plurality of spaced apart valve ports, a plurality of passages connected to the valve ports and extending to the first surface area, means for closing each end of the bore and forming chambers at opposite ends thereof, a pilot pressure passage and a pilot return passage extending from the first surface area to the second surface area, said pilot pressure passage also being connected to one of the valve ports, means for opening and closing communication between said valve port and said passage, and separate passages extending from the second surface area to the chambers.

2. A directional control valve housing comprising a body including a first and a second opposed flat surface area, a valve receiving bore extending through the body including spaced apart pressure and return ports and at least one operating port, means closing each end of the bore and forming chambers at opposite ends thereof, separate pressure, return, and operating passages connected to each corresponding valve bore port and extending to the first surface area, separate passages connected to the chambers and extending to the second surface area, a pilot return passage opening to the second surface area, and a pilot pressure passage separate from the first pressure passage and extending from the first surface area to the second surface area.

3. A directional control valve housing comprising a body including a first and a second opposed flat surface area, a valve receiving bore extending completely through the body including spaced apart pressure and return ports and a pair of operating ports, means closing each end of the bore and forming chambers at opposite ends thereof, separate pressure, return, and operating passages connected to each corresponding valve bore port and extending to the first surface area, separate passages connected to the chambers and extending to the second surface area, a pilot pressure passage and a pilot return passage extending from the first surface area to the second surface area, means connecting the pilot pressure passage to the valve bore pressure port, and means for opening and closing communication between the pilot pressure passage and the valve bore pressure port.

4. A multiple purpose, two section valve casing for mounting a directional control valve and a pilot valve, said casing comprising in combination a directional control valve body including a first and a second flat surface area, a directional control valve bore extending completely through the body including spaced apart valve ports, fluid passages connected to the valve ports and extending to the first surface area, a pilot pressure passage and a pilot return passage extending completely through the body from the first to the second surface area, said pressure passage also being connected to one of the directional control valve bore ports, means for opening and closing said valve bore port to the pilot pressure passage, and separate passages each having one terminus thereof opening to the second surface area, and the opposite terminus thereof opening to the therminus thereof opening to the valve bore ends of the body, a pilot valve body having at least one flat surface area, a pilot valve bore extending completely through the body including spaced apart pressure, return, and operating ports, passages connected to said ports and extending to the flat surface of said body, and means for mounting said pilot valve body on the directional control valve body with the pilot valve passages registering in cooperative relationship with the directional control valve passages which extend to the second surface area of the latter valve body.

5. A multiple purpose, two section valve casing for mounting a directional control valve and a pivot and a pilot valve, said casing comprising in combination a directional control valve body including a first and a second flat surface area, a directional control valve bore extending through the body, ports spaced along said bore including a pressure port, a return port and at least one operating port, separate pressure return and operating passages connected to each valve bore port and extending to the first surface area, a pilot pressure passage separate from the first pressure passage extending completely through the body from the first to the second surface area, a pilot return passage opening to the second surface area, and separate passages each having one terminus thereof opening to the second surface area, and the opposite terminus thereof, opening to the valve bore ends of the body, a pilot valve body having at least one flat surface area, a pilot valve bore extending completely through the body including spaced apart pressure, return, and at least one operating port, separate pressure, return and operating passages connected to said ports and extending to the flat surface of said body, and means for mounting said pilot valve body on the directional control valve body with the pilot valve passages registering in cooperative relationship with the directional control valve passages which extend to the second surface area of the latter valve body.

6. A directional control valve housing comprising a body including a first and a second opposed, flat surface area, a valve receiving bore extending through the body including a plurality of spaced apart valve ports, a plurality of passages connected to the valve ports and extending to the first surface area, means for closing each end of the bore and forming chambers at opposite ends thereof, a pilot return passage opening to the second surface area, a pilot pressure passage extending from the first surface area to the second surface area, said pilot pressure passage also being connected to one of the valve ports, means for opening and closing communication between said said valve port and said passage, and separate passages extending from the second surface area to the chambers.

7. A directional control valve housing comprising a body including a first and a second opposed flat surface area, a valve receiving bore extending through the body including spaced apart pressure and return ports and a pair of operating ports, means closing each end of the bore and forming chambers at opposite ends thereof, separate pressure, return, and operating passages connected to each corresponding valve bore port and extending to the first surface area, separate passages connected to the chambers and extending to the second surface area, a pilot return passage opening to the second surface area, a pilot pressure passage extending from the first surface area to the second surface area, means connecting the pilot pressure passage to the valve bore pressure port, and means for opening and closing communication between the pilot pressure passage and the valve bore pressure port.

8. A multiple purpose, two section valve casing for mounting a directional control valve and a pilot valve, said casing comprising in combination a directional control valve body including a first and a second flat surface area, a directional control valve bore extending through the body including spaced apart valve ports, fluid passages connected to the valve ports and extending to the first surface area, a pilot return passage opening to the second surface area, a pilot pressure passage extending from the first surface area to the second surface area, said pressure passage also being connected to one of the directional control valve bore ports, means for opening and closing said valve bore port to the pilot pressure passage, and separate passages each having one terminus thereof, opening to the second surface area and the opposite terminus thereof opening to the valve bore ends of the body, a pilot valve body having at least one flat surface area, a pilot valve bore extending completely through the body including spaced apart pressure, return, and operating ports, passages connected to said ports and extending to the flat surface of said body, and means for mounting said pilot valve body on the directional control valve body with the pilot valve passages registering in cooperative relationship with the directional control valve passages which extend to the second surface area of the latter valve body.

DUNCAN B. GARDINER.

REFERENCES CITED

The following references are of record in the file of this patent:

UNITED STATES PATENTS

| Number | Name | Date |
|---|---|---|
| 712,088 | Paulsen | Oct. 28, 1902 |
| 1,779,608 | Lower | Oct. 28, 1930 |
| 1,910,766 | Hobson | May 23, 1933 |
| 2,057,087 | DeMillar | Oct. 13, 1936 |
| 2,200,824 | Herman | May 14, 1940 |
| 2,247,140 | Twyman | June 24, 1941 |
| 2,247,141 | Twyman | June 24, 1941 |
| 2,380,510 | Fitch | July 31, 1945 |
| 2,443,809 | Terbeek | June 22, 1948 |
| 2,456,651 | Schmiel | Dec. 21, 1948 |